United States Patent [19]

Krc et al.

[11] Patent Number: 5,605,003

[45] Date of Patent: Feb. 25, 1997

[54] COLLAPSIBLE FISH NET

[76] Inventors: Paul Krc, 7427 Beverly Blvd., Everett, Wash. 98203; Steve Studley, 212 N. Russell Rd., Snohomish, Wash. 98290

[21] Appl. No.: 541,019

[22] Filed: Oct. 11, 1995

[51] Int. Cl.$^6$ ................................................ A01K 77/00
[52] U.S. Cl. ................................................ 43/12
[58] Field of Search ............................ 43/7, 12, 134; 209/417, 418, 419; 119/245, 264

[56] References Cited

U.S. PATENT DOCUMENTS

| | | | |
|---|---|---|---|
| 2,457,922 | 1/1949 | Robinson | 43/12 |
| 2,619,755 | 12/1952 | Henson | 43/12 |
| 2,657,491 | 11/1953 | Ziebell | 43/12 |
| 2,683,321 | 7/1954 | Faber | 43/12 |
| 3,167,878 | 2/1965 | Daffron | 43/12 |
| 4,574,513 | 3/1986 | Wearing | 43/12 |
| 5,081,789 | 1/1992 | Rhee | 43/134 |

FOREIGN PATENT DOCUMENTS 486263  9/1952  Canada .

OTHER PUBLICATIONS

*Cabela's Tackle Shop 1994*, catalogue excerpt, p. 150, item No. HE–02096–014.

Primary Examiner—Joseph J. Hail, III
Assistant Examiner—Jay A. Stelacone
Attorney, Agent, or Firm—Christensen, O'Connor, Johnson & Kindness PLLC

[57] ABSTRACT

A collapsible fish net includes a pair of support arms (14, 16), a handle (12) and a flexible mesh material (28) disposed between the support arms. When not in use, the net is placed in a scabbard (40) with the support arms in a closely spaced, parallel relationship. When the net is removed from the scabbard, a spring 18 moves the arm (16) with respect to the arm (14) thereby opening the mesh material. A fish is guided into the mesh material so its weight causes the mesh material to collapse along the length of the fish, thereby securing the fish until it can be released.

13 Claims, 4 Drawing Sheets dig.2.

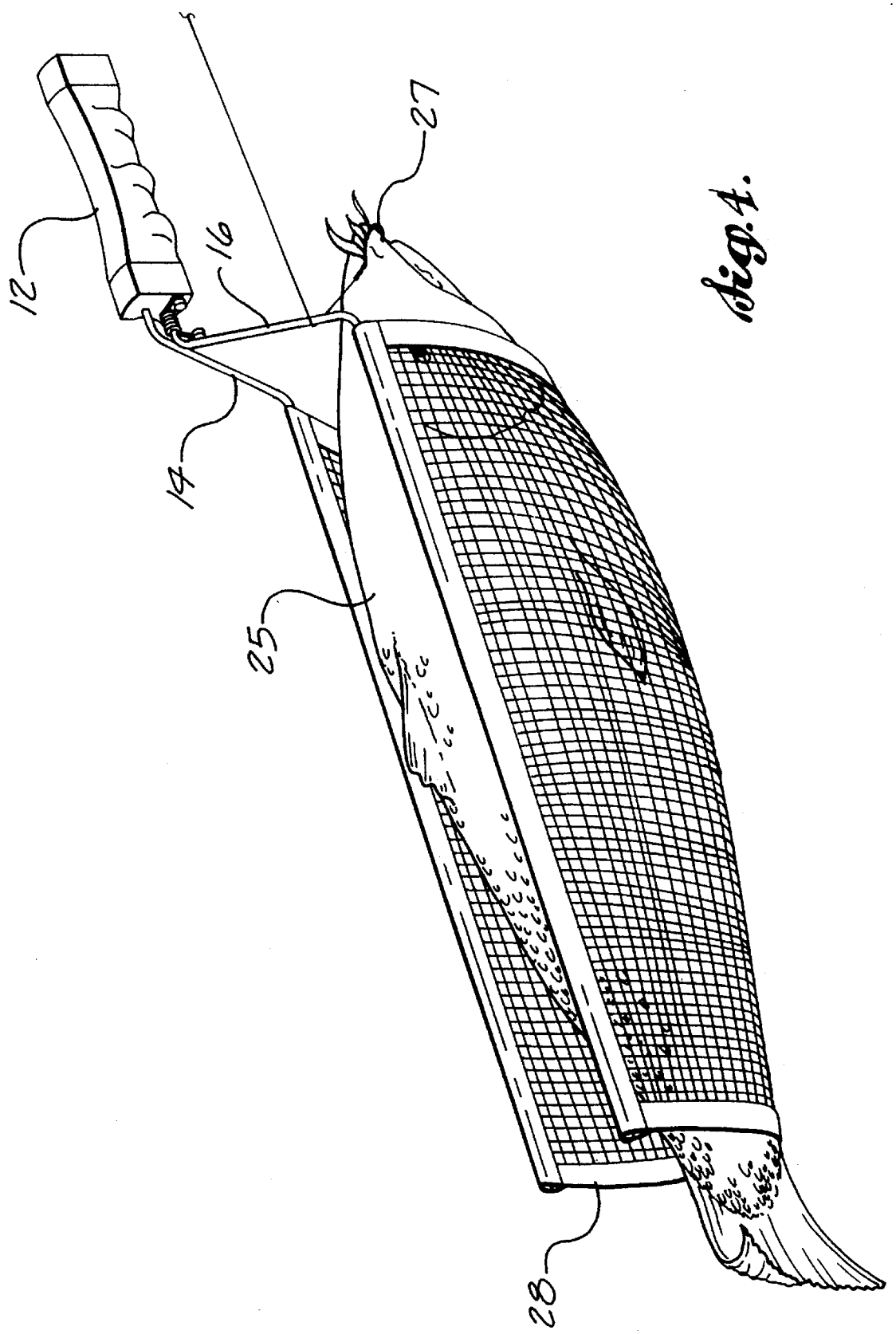

COLLAPSIBLE FISH NET

FIELD OF THE INVENTION

The present invention relates to fishing equipment in general, and in particular to collapsible fish nets.

BACKGROUND OF THE INVENTION

As more people take up recreational fishing, many anglers are practicing catch and release techniques to avoid depleting fish stocks. Provided that fish are handled carefully, most hooked fish can be released to fight again another day.

To aid in releasing fish, many anglers use a net to hold the fish while the hook is being removed. These nets generally have an oval or rectangular frame that supports a soft, loosely woven mesh material into which the fish is scooped. Conventional fish nets suffer from at least three problems which limit their effectiveness. First, these nets are typically secured to a ting on the back of a user's fishing vest and can be difficult to detach when playing a fish. Additionally, if used from a floatation device such as a float tube, these nets can take up valuable space and hinder maneuverability. Finally, and most important, most conventional nets allow the fish to bend or flop about as the angler attempts to remove the hook, thereby increasing the chance that the fish will be injured when released.

Therefore, there is a need for a catch and release fish net that is small and compact, is easy to use when playing a fish and minimizes potential injury to a fish as it is being released.

SUMMARY OF THE INVENTION

The present invention is a collapsible fish net that includes a pair of support arms cantilevered from a handle, and a flexible mesh material supported by and extending between the support arms. When not in use, the support arms are swung to a closely spaced, parallel relationship and stored in a scabbard. When the net is removed from the scabbard, a spring moves one of the arms with respect to the other arm, thereby opening the net. A fish is guided into the mesh whereby its weight causes the mesh to collapse along the length of the fish, thereby uniformly supporting and securing the fish until it can be released. The user can remove the hook without ever having to touch the fish directly.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is an environmental view showing how the collapsible fish net of the present invention is used to restrain a fish until it is released.

DETAILED OF THE PREFERRED EMBODIMENT

Figure 1:
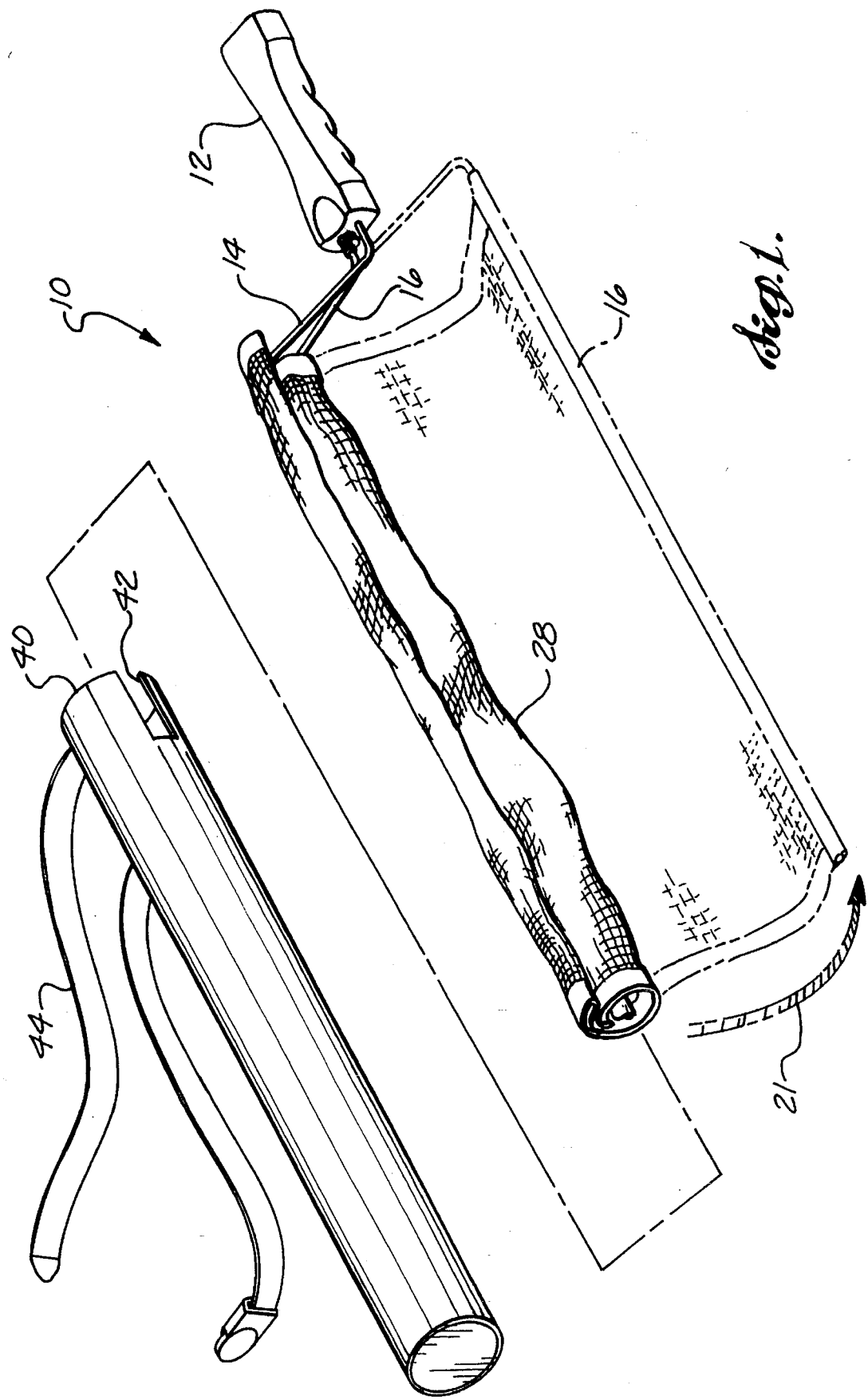
FIG. 1 is an isometric view of a collapsible fish net and scabbard according to the present invention.

The present invention is a collapsible fish net that can be used to release fish unharmed. As shown in FIG. 1, the preferred collapsible fish net 10 includes a handle 12 and a pair of parallel-spaced, longitudinally extending arms 14 and 16. The arms 14 support a flexible mesh material 28 that cradles a fish as it is being caught, unhooked and released.

When the net 10 is not being used, the arms 14 and 16 fold together, thereby collapsing the mesh. The net 10 is then stored in a scabbard 40, which is secured to a user by means of a strap 44. The scabbard includes a notch 42 at its outer end that receives the handle 12 in order to prevent the net from rotating about when not in use.

To use the net, the handle 12 is pulled out from the scabbard. A spring mechanism, described in further detail below, automatically rotates the arm 16 through an are 21 away from the arm 14. The mesh material 28 is opened and the net is ready to secure a fish until it is released.

Figure 2:
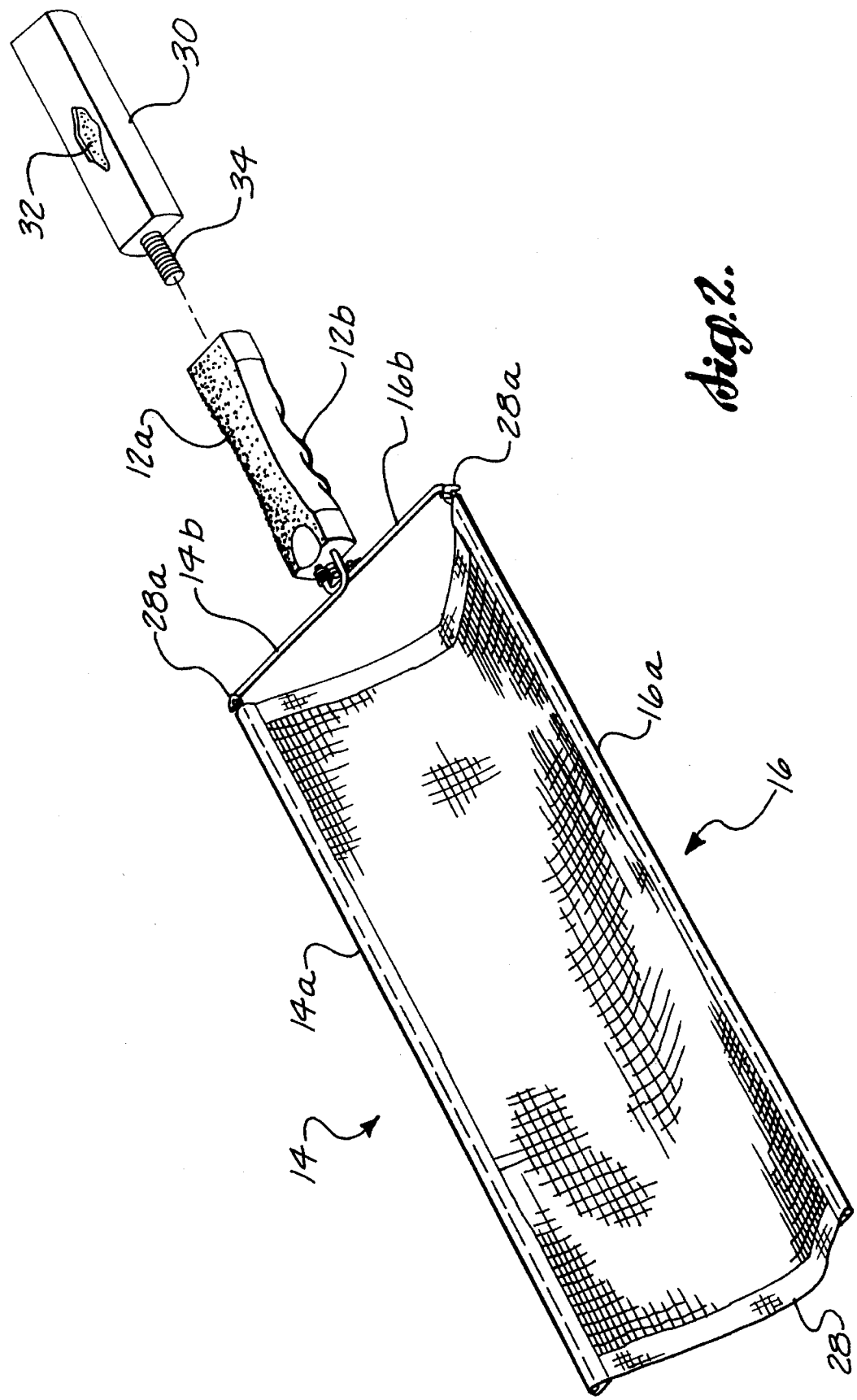
FIG. 2 is an isometric view of the fish net of the present invention shown in an open position.

FIG. 2 illustrates the collapsible net 10 of the present invention in an open position. As described above, the mesh material 28, is supported on either side by the arms 14 and 16. The arm 14 remains in a fixed position while the arm 16 moves to open or close the net. The arm 16, has an outer section 16a that carries the adjacent edge or margin of the mesh, a middle section 16b that extends at roughly ninety degrees to the outer section and a base section 16c that is inserted to the handle 12. The outer and base sections of the arm extend generally parallel to one another, in opposite directions from the middle section 16b, and are offset by the length of the middle section 16b.

The outer section of the arm 16a preferably includes a lip at the point where the outer section of the support arm joins the middle section. A loop 28a at a corner of the mesh material is fitted over the lip to prevent the mesh from slipping off the support arms. The lip also allows the mesh material to be easily changed. For example, when fishing for delicate fish such as trout, it may be desirable to use a softer mesh than when fishing for bass, etc. To change nets, a user simply lifts the loop 28a of the mesh over the lip, pulls off the mesh and slides on a new one. The arm 14 is constructed in the same manner as the arm 16 and therefore is not discussed in further detail.

With reference to FIG. 2, the handle 12 includes a top half 12a and a bottom half 12b. The top half is preferably flat while the bottom half 12b includes finger guides so that the user can identify the correct orientation of the net without having to look at the handle. Alternatively, the top half may be checkered or roughened, while the bottom half may be smooth to provide the same benefit.

A handle extension 30 includes a threaded member 34 that can be secured within a butt section of the handle 12. The handle extension 30 is preferably hollow or contains a floatation material 32 that is sufficiently buoyant to prevent the net from sinking when dropped in water. The handle extension 30 is particularly useful when the net is used in a float tube or other boat so that the net will not sink if dropped overboard. Alternatively, it is possible to equip the handle with a ring that can be used to tie the net to the boat if desired.

Figure 3:
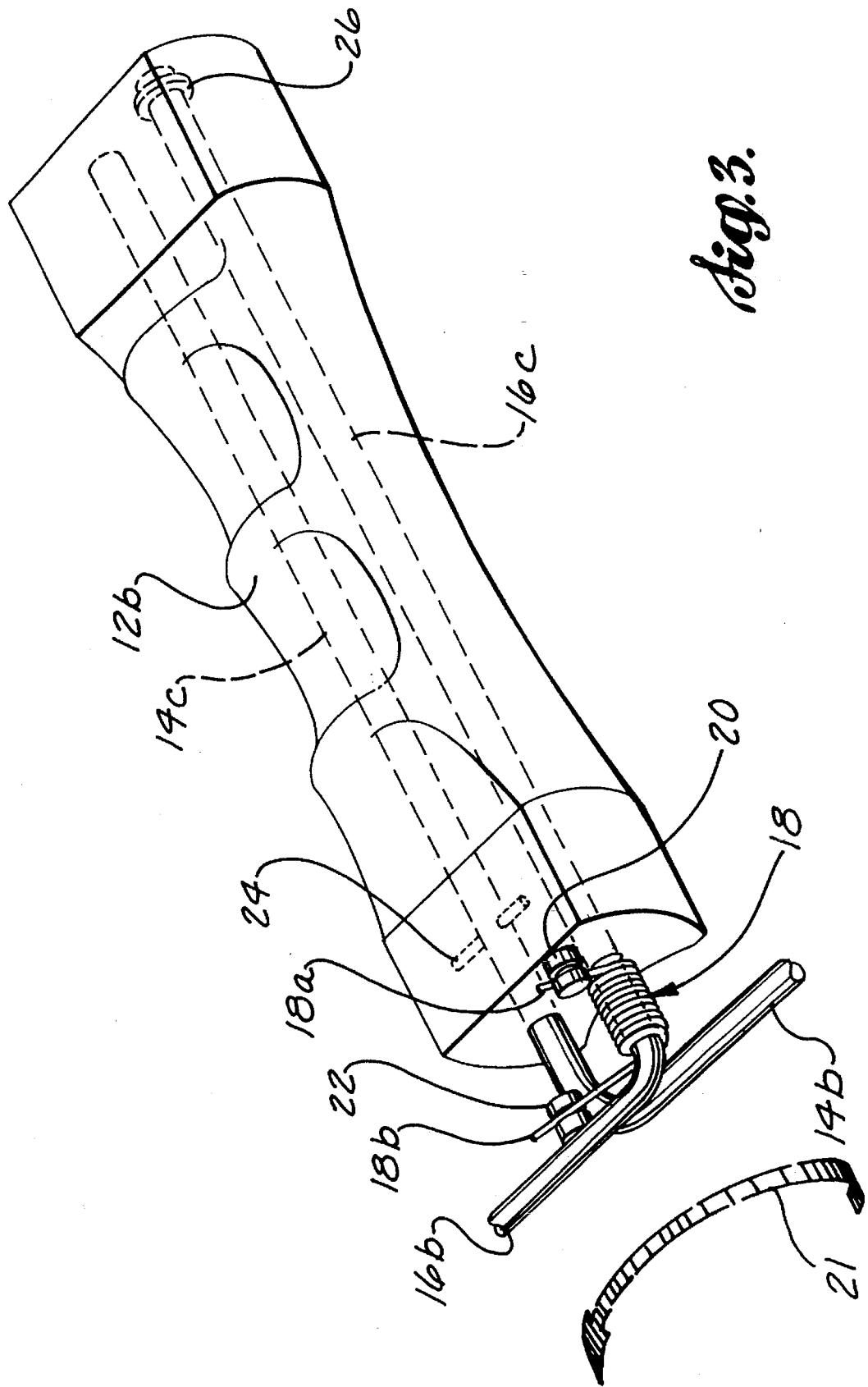
FIG. 3 is a close-up view of a handle and spring mechanism for automatically opening the net when removed from the scabbard.

FIG. 3 illustrates how the support arms 14 and 16 are mounted in the handle 12 as well as the mechanism for opening the support arms when the collapsible net is removed from the scabbard. The handle 12 includes two parallel longitudinal bores that open through the opposite ends of the handle. One of the bores receives the base portion 14c of the support arm 14 while the other bore receives the base portion 16c of the support arm 16. The support arm 14 is prevented from rotating in the handle by a pin 24 which extends through the handle and the support arm in a direction perpendicular to the longitudinal axis of the support arm. The support arm 16a is secured in the handle by a snap washer 26 which engages a notch at an end of the base portion 16c in order to prevent the support arm from being removed from the handle. The support arm 16 is therefore free to rotate in the handle 12.

As the net is removed from the scabbard, a torsion spring 18 moves the support arm 16 into the open position. The helical body of the spring 18 encircles the support arm 16 at the front of the handle. The spring 18 has two ends 18a and 18b. The end 18a engages a spring stop 20 which is secured to a from face of the handle 12. The second end 18b of the spring engages a second spring stop 22 which projects from the middle section 16b of the support arm 16. When the collapsible net is removed from the scabbard, the spring 18 pushes the support arm 16 through the are 21 in order to open the support arms. Movement of the support arm 16 is stopped when the spring stop 22 engages the support arm 14.

To close the net, a user manually moves the support arm 16 from the open position to a position adjacent to the support arm 14 and loosely rolls up the mesh material 28 in a manner that will not interfere with the automatic reopening. The net is then stored by inserting the mesh and outer portions of the support arms into the scabbard.

FIG. 4 shows how the collapsible net of the present invention is used to release a fish 25. As the fish is caught, it is guided headfirst into the mesh material 28 when the net is in the open position. As the net is lifted, the weight of the fish causes the support arm 16 to rotate toward the fixed arm 14, thereby collapsing the mesh material 28 around the fish. As can be seen in FIG. 2, the flexible mesh 28 has a substantially constant width from the point nearest the handle to the point at the ends of the support arms, thereby providing support along the entire length of the fish when the mesh is collapsed. As the fish feels the mesh around the entire length of its body, it is prevented from thrashing back and forth, thereby allowing an angler to safely remove a hook 27 from the fish. Once the hook is removed, the fish can be gently eased out of the mesh material 28 and released.

If desired, the net 10 according to the present invention, can also be used with a conventional basket mesh. The basket mesh (not shown) includes two sleeves though which the support arms 14 and 16 are inserted. To use the net with the basket mesh, the net is operated in the upside down position such that the support arms hold the basket open, but are prevented from rotating further than 180° apart. The support arms can then be folded to close the basket mesh when the net is stored. The basket mesh could be used when an angler has no desire to release a fish or when fishing for fish that will be less likely to be injured in the process of removing a hook.

As can be seen, the benefits of the present invention are many. First, the net is compact when not in use. Because the net fits into the scabbard which is stored on a user's belt or over the user's shoulder, it does not occupy much room and is less likely to get tangled if the angler is walking through bushes on the way to a stream. Secondly, the net is easily extended by simply removing it from the scabbard, thereby allowing the angler to concentrate on the fish at the end of the line. Finally, because the net provides support along the entire length of the fish so that the fish cannot bend, the fish can be released without harm and without ever having to touch the fish.

While the preferred embodiment of the invention has been illustrated and described, it will be appreciated that various changes can be made therein without departing from the spirit and scope of the invention. For example, the dimensions of the support arms may be changed depending on the size of fish being sought. For steelhead or salmon, the middle section of the support arms may be angled at less than ninety degrees to make additional room for a fish's head. It is therefore intended that the scope be determined solely from the following claims.

The embodiments of the invention in which an exclusive property or privilege is claimed are defined as follows:

1. A collapsible fish net comprising:

a handle having a longitudinal axis;

first and second support arms each having a first portion that is secured to the handle and a second portion that extends parallel to and spaced apart from the longitudinal axis of the handle;

a flexible mesh having a pair of open ends to form a sling that is extendable between the first and second support arms; and means for moving the support arms from a first position where the first and second support arm are adjacent to one another to a second position where the first and second support arms are spaced farther apart such that the flexible mesh is extended.

2. The collapsible fish net of claim 1, whereby the means for moving the support arms comprises a spring.

3. The collapsible net of claim 1, further comprising a cylindrical scabbard in which the net can be carried when the support arms are in the first position.

4. The collapsible net of claim 1, wherein the support arms include means for removably securing the flexible mesh to the support arms.

5. The collapsible net of claim 1, wherein one of the first or second support arms is rigidly secured to the handle and the other of the first and second support arms is rotatable within the handle.

6. The collapsible net of claim 1, further comprising a handle extension that is removably securable to the handle, the handle extension including a floatation material that prevents the collapsible fish net from sinking.

7. A collapsible fish net comprising:

a handle having a longitudinal axis;

first and second support arms each having a first portion secured within the handle, a second substantially straight portion that extends parallel to and spaced apart from the longitudinal axis of the handle and a middle portion that connects the first and second portions of the support arms, the first support arm being fixed within the handle and the second support arm being rotatable within the handle from a position where the second portions of the first and second support arms are adjacent to a position where the second portions of the first and second support arms are spaced apart;

a flexible mesh extendable between the first and second support arms; and a spring coupled to the second support arm that biases the second support arm apart from the first support arm to extend the flexible mesh, wherein a weight of a fish disposed in the flexible mesh compresses the spring and collapses the mesh along a length of the fish.

8. The collapsible net of claim 7, further comprising a cylindrical scabbard in which the net can be carried when the support arms are in the first position.

9. The collapsible net of claim 7, wherein the support arms include means for removably securing the flexible mesh to the support arms.

10. The collapsible net of claim 7, further comprising a handle extension that is removably securable to the handle, the handle extension including a floatation material that prevents the collapsible fish net from sinking.

11. The collapsible net of claim 7, wherein the flexible mesh forms a sling having a pair of open ends when the support arms are in the second position.

12. The collapsible net of claim 11, wherein the flexible net is secured along a length of the substantially straight portion of the support arms and has a substantially constant width from a point near the handle to the end of the support arms.

13. The collapsible net of claim 7 wherein the flexible mesh is a basket net.

* * * * *